July 1, 1958    M. J. CHERAMIE    2,841,454
MOUNTING AND DRIVE MEANS FOR SPROCKET WHEELS
Filed Dec. 2, 1955
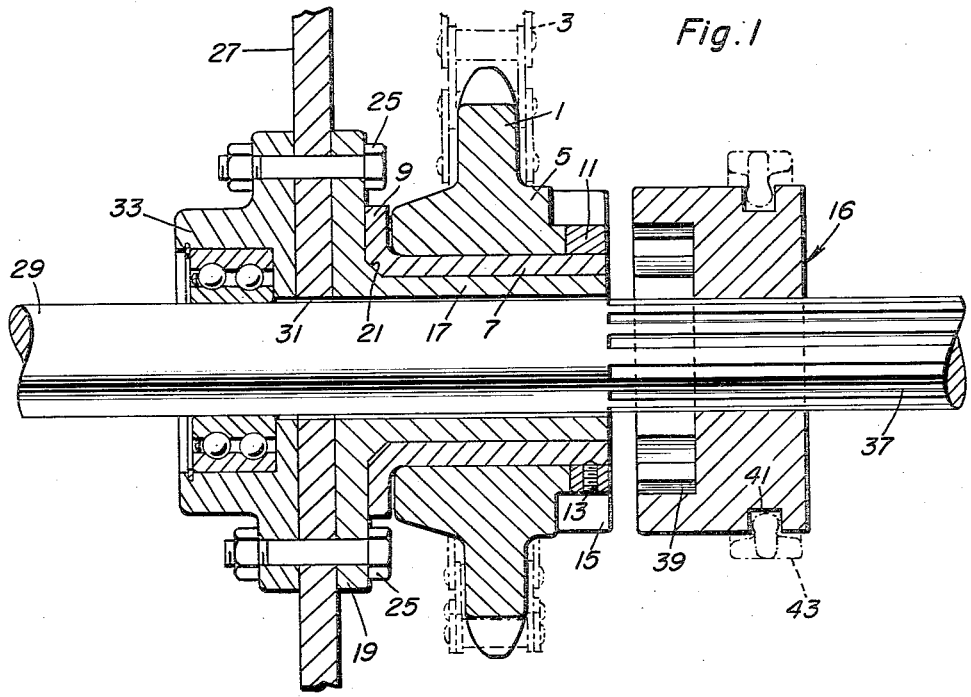
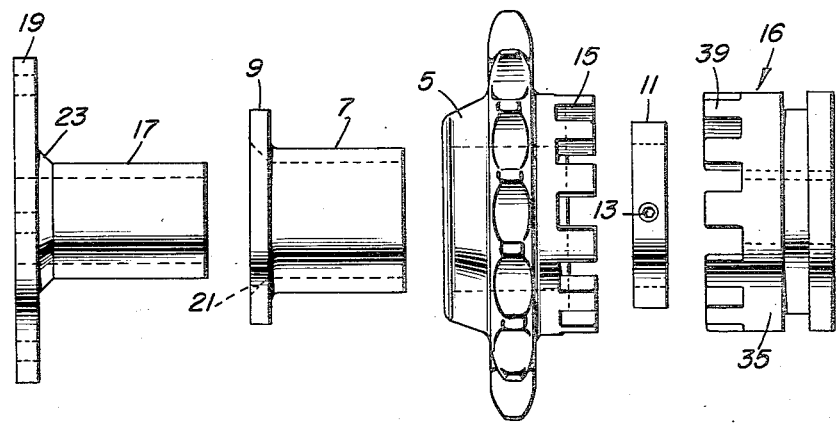
Mark J. Cheramie
INVENTOR.

United States Patent Office 2,841,454
Patented July 1, 1958

2,841,454

MOUNTING AND DRIVE MEANS FOR SPROCKET WHEELS

Mark J. Cheramie, Cut Off, La., assignor to Andrew A. Cheramie Marsh Buggies, Inc., Cut Off, La.

Application December 2, 1955, Serial No. 550,690

1 Claim. (Cl. 308—15)

My invention relates to improvements in mounting and drive means for sprocket wheels of sprocket and chain drives.

The primary object of my invention is to provide in a clutch drive for a sprocket wheel, for mounting the sprocket wheel intermediate the ends of a drive shaft therefor for idling without friction between the sprocket wheel and the drive shaft, nor between the shaft and the mounting, and whereby to reduce wear and replacement expense in mounting and driving such wheels.

Other and subordinate objects, together with the precise nature of my improvements, will be readily understood when the following description and claim are read with reference to the accompanying drawing forming part of this specification and in which:

Figure 1 is a fragmentary view in longitudinal section of my invention in the preferred embodiment thereof, and Figure 2 is an exploded view of parts of the mounting and drive means shown in side elevation.

Referring to the drawing by numerals, according to my invention, a sprocket wheel 1 for driving a sprocket chain 3 and having a hub 5 is freely rotatably mounted on a bronze bushing 7 and confined thereon against side play between a circumferential flange 9 on one end of the bushing 7 and a bronze keeper ring 11 on the other end of said bushing secured thereto by "Allen" head screws 13.

The hub 5 of the sprocket wheel 1 at one end thereof contiguous the keeper ring 11 is provided with circumferentially spaced clutch teeth 15 overlying the keeper ring 11 and for engagement by a shiftable clutch member 16 presently described.

The bronze bushing 7 is press fitted on a tubular steel support 17 therefor provided with a circumferential end flange 19 of larger diameter than the flange 9, for a purpose presently seen, and against which the flange 9 fits flatly. The flanged end of the bushing 7 is internally beveled, as at 21, for a wedge fit on a beveled circumferential shoulder 23 on the support 17 at the flange 19. The support 17 is bolted, as at 25, through the flange 19 thereof to one side of a mounting plate 27, or the like, which may be part of a drive casing or housing.

The drive shaft 29 is relatively smaller in diameter than the support 17 and extends therethrough and through an opening 31 in the mounting plate 27 with a slight clearance to obviate frictional engagement therewith, and is supported at one point in its length at the side of the plate 27 opposite that to which the support 17 is bolted, by an antifriction bearing 33 secured to said opposite side of the plate 27 by the aforementioned bolts 25. As will be understood, the drive shaft 29 will be similarly supported at other points in its length.

The before-mentioned clutch member 16 comprises a clutch collar 35 splined, as at 37, on the drive shaft 29 opposite the clutch teeth 15 and provided with a circular series of clutch teeth 39 adapted to be engaged with the clutch teeth 15 and to overlie the keeper ring 11. The clutch collar 35 is provided with the conventional groove 41 for engagement by a conventional clutch shifter 43 to slide said collar into and from engagement with respect to the sprocket wheel 1 for drive or idling of said wheel.

As will now be seen, my invention provides for eliminating completely all wear on the sprocket wheel 1 and drive shaft 29 when said wheel is idle and the drive shaft is rotating, and reduces to a minimum wear on the drive shaft 29. Also, as will be manifest, the bushing 7 and keeper ring 11 provide a wear-resistant bearing for the sprocket wheel 1 and for easily and quickly replacing said wheel by others of different diameters.

The foregoing will, it is believed, suffice to impart a clear understanding of my invention without further explanation.

Manifestly, the invention is susceptible of modification without departing from the inventive concept, and right is herein reserved to such modifications as fall within the scope of the appended claim.

What is claimed as new is as follows:

In combination, a plate having an opening therein, a rotary shaft extending through the opening and from opposite sides of the plate, a sprocket wheel for rotating the shaft having a hub adapted to be operatively connected to the shaft, means for mounting the shaft at one side of the plate comprising an anti-friction bearing secured to said one side of the plate and journalling said shaft, and means for mounting the sprocket wheel at the other side of the plate coaxially of said shaft and clear of the same comprising a tubular support surrounding said shaft coaxially thereof and clear of the same and having a circumferential end flange secured to said other side of the plate, and a bushing fixed on said tubular support and rotatably supporting said hub, said bushing having a flange on one end and a keeper ring on the other end confining said hub on the bushing.

References Cited in the file of this patent

UNITED STATES PATENTS

| | | |
|---|---|---|
| 1,014,481 | Juengst | Jan. 9, 1912 |
| 2,635,727 | Bitler | Apr. 21, 1953 |
| 2,714,820 | Chamberlain | Aug. 9, 1955 |